(12) United States Patent
Mitsugi

(10) Patent No.: US 6,788,891 B1
(45) Date of Patent: Sep. 7, 2004

(54) BACK FOCUS ADJUSTING MECHANISM FOR IMAGING CAMERA

(75) Inventor: Hirokazu Mitsugi, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 0 days.

(21) Appl. No.: 10/685,856

(22) Filed: Oct. 15, 2003

(30) Foreign Application Priority Data

May 19, 2003 (JP) ........................................ 2003-140299

(51) Int. Cl.[7] .................................................. G03B 3/00
(52) U.S. Cl. ........................................ 396/144; 348/345
(58) Field of Search ............................ 396/144; 348/345

(56) References Cited

U.S. PATENT DOCUMENTS 5,555,051 A * 9/1996 Maruyama et al. ......... 396/144
6,683,654 B1 * 1/2004 Haijima ..................... 348/374

* cited by examiner

Primary Examiner—W. B. Perkey
(74) Attorney, Agent, or Firm—Koda & Androlia

(57) ABSTRACT

A back focus adjusting mechanism for an imaging camera includes a coil spring provided around a cylindrical portion of a lens mount of the camera, an imaging element holder holding an imaging element so that the imaging element is moved along an optical axis of an imaging lens by a guide of the lens mount, an adjusting ring provided with a cam the imaging element holder engages, a positioning holder fixed in the camera housing and positioning the adjusting ring so that the adjusting ring is rotatable around the cylindrical portion of the lens mount, the imaging element holder abutting the cam by rotation of the adjusting ring being moved, a spring member pressing the adjusting ring against the positioning holder and fixed in the camera housing, and a knob member operated outside the camera housing. The adjusting ring is fixed at an adjustment position while being subjected to a pressing force of the spring member by the knob member.

4 Claims, 3 Drawing Sheets

BACK FOCUS ADJUSTING MECHANISM FOR IMAGING CAMERA

BACKGROUND OF THE INVENTION

1. Field of the invention

This invention relates to a back focus adjusting mechanism provided in imaging cameras.

2. Description of the Related Art

JP-A-2000-165733 discloses aback focus adjusting mechanism for an imaging camera. The disclosed mechanism comprises a rotatable adjusting ring and a cam mechanism actuated with rotation of the adjusting ring so that an imaging element unit is moved along an optical axis of an optical system. A leaf spring applies a pressing force to the adjusting ring when the adjusting ring reaches an adjustment position, whereby the adjusting ring is locked at the adjustment position.

In the above-described back focus adjusting mechanism, however, a locking screw is screwed into a camera housing from outside so that the leaf spring is deflected by the locking screw, whereupon the adjusting ring is locked at the adjustment position. Accordingly, the back focus adjustment requires a tool, such as a screwdriver, for driving the locking screw, resulting in problems in the speediness and operability.

SUMMARY OF THE INVENTION

Therefore, an object of the present invention is to provide a back focus adjusting mechanism which can overcome the foregoing problems and is easy in the operation for back focus adjustment.

The present invention provides a back focus adjusting mechanism for an imaging camera Including a camera housing, a lens mount protruding in the camera housing and including a cylindrical portion formed with a guide, an imaging element and an imaging lens. The back focus adjusting mechanism comprises a coil spring provided around the cylindrical portion of the lens mount, an imaging element holder holding the imaging element so that the imaging element is moved along an optical axis of the imaging lens by the guide of the lens mount, an adjusting ring provided with a cam the imaging element holder engages, a positioning holder fixed in the camera housing and positioning the adjusting ring so that the adjusting ring is rotatable around the cylindrical portion of the lens mount, the imaging element holder engaging the cam by rotation of the adjusting ring being moved, a spring member pressing the adjusting ring against the positioning holder and fixed in the camera housing, and a knob member operated outside the camera housing. The adjusting ring is fixed at an adjustment position while being subjected to a pressing force of the spring member by the knob member.

In the above-described mechanism, the imaging element holder abutting the cam by the rotation of the adjusting ring is moved so that the back focus of the imaging camera is adjusted. In order that the adjusting ring may be fixed at the adjustment position, the knob member is operated outside the camera housing so that the adjusting ring is kept pressed against the positioning holder. Thus, the adjusting ring can be fixed at the adjustment position only by operating the knob member outside the camera housing. Consequently, the back focus adjustment can be carried out readily and quickly without use of a tool such as a screwdriver.

In a preferred form, the camera housing has a side wall formed with an opening, and the mechanism further comprises a slider provided on an inner wall of the camera housing so as to be vertically slid and including a pressing boss, the knob member being mounted on the slider so that the knob member is operated through the opening. In this construction, the slider is slid so that the spring member is pressed by the pressing boss, whereby the adjusting ring is fixed at the adjustment position while being subjected to the pressing force of the spring member. Accordingly, the adjusting ring can be fixed at the adjustment position only by sliding the slider without use of a tool such as a screw driver readily and quickly.

In another preferred form, the spring member comprises a leaf spring including a spring body and a pressing portion continuous from the spring body and bent into a U-shape, the pressing portion being abutted against the adjusting ring. Since the spring member comprises the leaf spring, a mounting space for the spring member in the camera housing can be reduced.

BRIEF DESCRIPTION OF THE DRAWINGS

Other objects, features and advantages of the present invention will become clear upon reviewing the following description of an embodiment, made with reference to the accompanying drawings, in which.

DETAILED DESCRIPTION OF THE INVENTION

Figure 1:
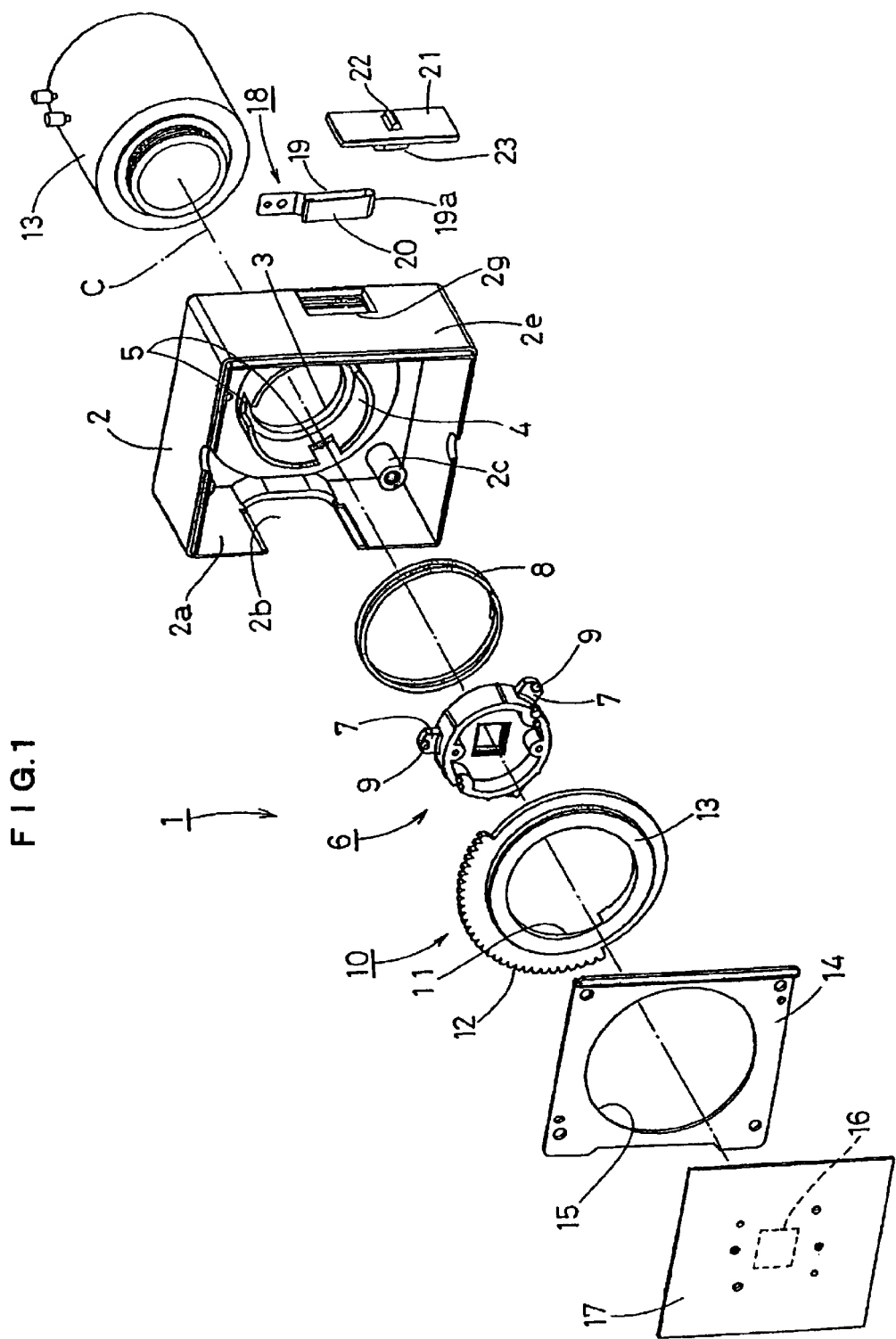
FIG. 1 is an exploded perspective view of the back focus adjusting mechanism of an embodiment in accordance with the present invention, the mechanism being applied to a CCD camera.
Figure 2:
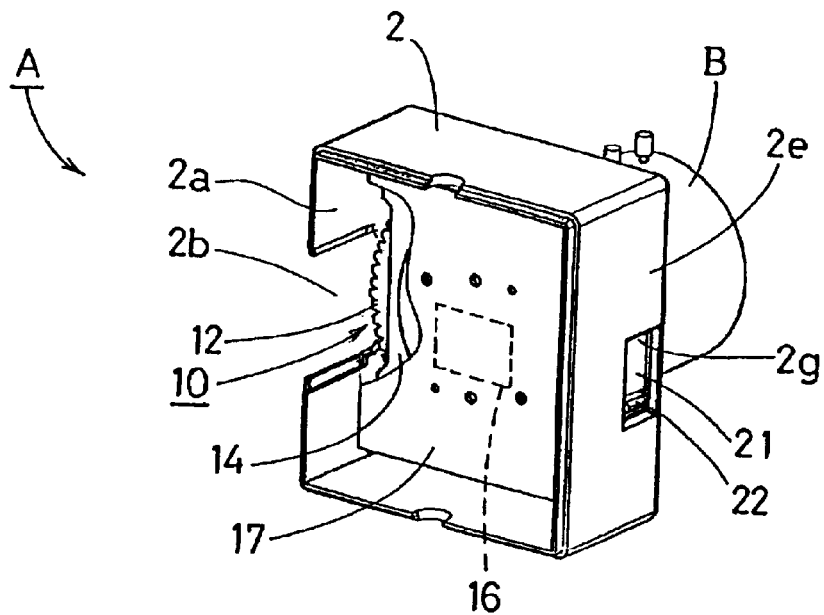
FIG. 2 is a partially cut-out perspective view of the CCD camera as viewed from the rear.

One embodiment of the present invention will be described with reference to the drawings. Referring to FIG. 1, a back focus adjusting mechanism 1 of the embodiment is shown as being provided in an imaging camera or CCD camera A. The CCD camera A includes a generally rectangular camera housing 2 having a front with a central opening (not shown). A generally cylindrical metal lens mount 3 is fixed to an inner front wall of the housing 2 so as to be located in an interior of the camera housing. A lens tube B is screwed into the lens mount 3. The lens mount 3 is formed with a cylindrical portion 4 protruding in the interior of the camera housing 2. The cylindrical portion 4 has three guide grooves 5 each of which is formed by cutting out a rear end thereof at Intervals of 120 degrees.

A generally cylindrical imaging element holder or CCD holder 6 has three protrusions 7 formed on an outer periphery thereof at intervals of 120 degrees. The protrusions 7 of the CCD holder 6 are fitted into the respective guide grooves 5 of the lens mount 3 so that the CCD holder is held in the cylindrical portion 4 so as to be moved along an optical axis C of an imaging lens (not shown). A coil spring 8 is provided on the outer periphery of the cylindrical portion 4 so as to apply a biasing force thereof to front faces of the protrusions 7, thereby biasing the CCD holder 6 rearward. Each protrusion 7 has a rear face formed with a cam abutting face 9 a cam 11 abuts as will be described later.

Figure 3:
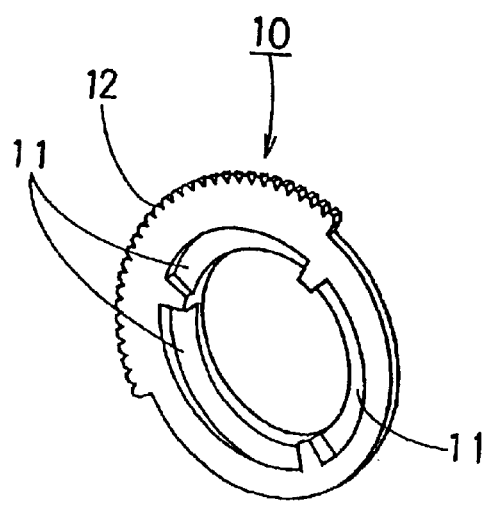
FIG. 3 is a perspective view of an adjusting ring of the back focus adjusting mechanism.

An adjusting ring 10 is loosely fitted on the outer periphery of the cylindrical portion 4. The adjusting ring 10 has three circular arc cams 11 formed along an inner peripheral end thereof. Each cam 11 engages the abutting face 9 of each protrusion 7 thereby to move the CCD holder 6 along the optical axis C. The cam face of each cam 11 is formed to be depressed from the front end face thereof as shown in FIG. 3. The adjusting ring 10 has a finger-operated portion 12 formed on a part of the outer periphery thereof. The finger-operated portion 12 projects outward through an opening 2b formed in a side wall 2a of the camera housing 2. The adjusting ring 10 has a rear side formed with a ring-shaped boss 13.

A generally rectangular positioning holder 14 has a circular through opening 15. The adjusting ring 10 is rotatably held on the cylindrical portion 4 with the boss 13 being fitted in the circular opening 15. The positioning holder 14 is fixed by screws to bosses 2c projecting on four corners of the camera housing 2 respectively, thereby positioning the adjusting ring 10 in the direction of an optical axis. A CCD substrate 17 is fixed to he rear end of the CCD holder 6 projecting through the circular opening 15 of the positioning holder 14. The CCD substrate 17 includes an imaging element or CCD element 16 arranged to correspond to the optical axis C.

The camera housing 2 includes a side wall 2e opposed to the side wall 2a formed with the opening 2b. A leaf spring 18 is fastened by screws 2f to an inner face of the side wall 2e. The leaf spring 18 includes a pressing spring portion 20 continuous from the spring body 19 and bent into a U-shape. The pressing spring portion 20 abuts the front of the adjusting ring 10. Furthermore, a slider 21 is provided on the inner face of the side wall 2e so as to be slid vertically by a guide (not shown). The slider 21 is provided with an operating knob 22 which is operated through an opening 2g formed in the side wall 2e.

Figure 4:
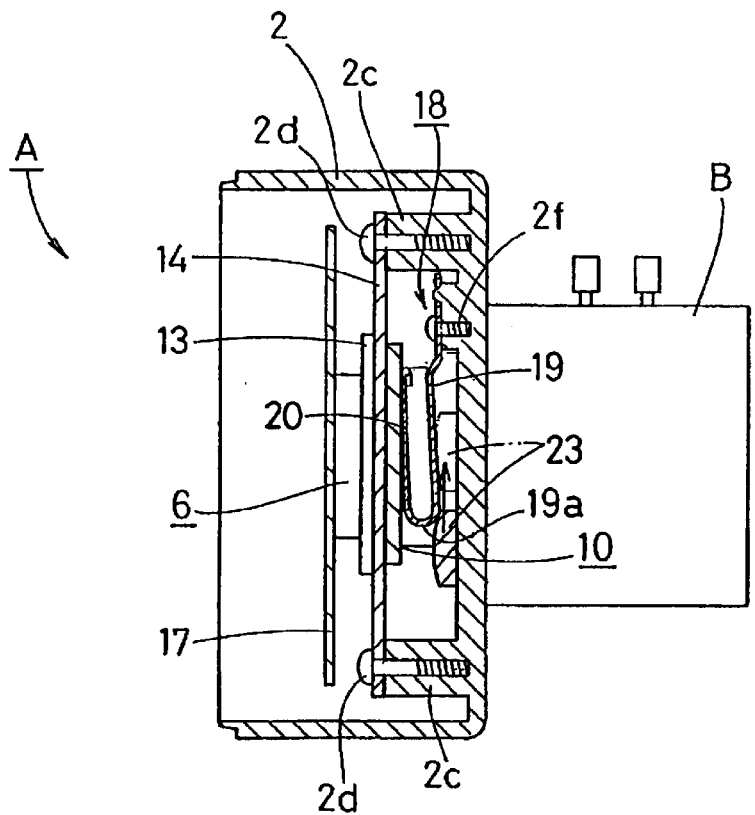
FIG. 4 is a sectional side view of the CCD camera.

The slider 21 has a pressing boss 23 formed on an inner face thereof so as to correspond to the U-shaped portion 19a of the spring body 19. When the slider 21 is slid, the pressing boss 23 presses the U-shaped portion 19a rearward, thereby entering a space in front of the spring body 19. The pressing boss 23 further pushes down the spring body 19 and the pressing spring portion 20 rearward, thereby applying a pressing force to the front face of the adjusting ring 10. Consequently, the adjusting ring can be held unrotatable (see FIG. 4).

The back focus adjusting mechanism 1 for the CCD camera A operates as follows. When finger-operated portion 12 is operated so that the adjusting ring 10 is rotated, the cam abutting face 9 is biased by the coil spring 8 to be engaged with or abutted against the cam 1, so that the CCD holder 6 is moved along the optical axis C in the cylinder 4. Thus, the back focus adjustment is carried out.

In order that the adjusting ring 10 may be fixed at the adjustment position, the operating knob 22 Is operated outside the camera housing 2 so that the slider 21 is slid. As a result, the U-shaped portion 19a is pressed rearward by the pressing boss 23 so that the pressing boss enters the space in front of the spring body 19. The pressing boss 23 further pushes down the spring body 19 and the pressing spring portion 20 rearward, thereby applying a pressing force to the front face of the adjusting ring 10, Consequently, the adjusting ring 10 is held unrotatable. Accordingly, when the operating knob 22 is operated outside the camera housing 2 so that the slider 21 is slid, the adjusting ring 10 can be fixed at the adjustment position. Consequently, the back focus adjustment can be carried out readily and quickly without use of a tool such as screwdriver.

Figure 5:
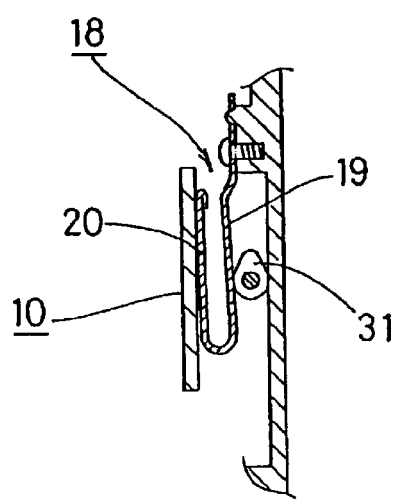
FIG. 5 illustrates a modified form including a rotating member.

The slider 22 is employed as the knob member in the foregoing embodiment. However, as shown as a modified form in FIG. 5, a rotating member 31 such as a cam or eccentric disc may be rotated so that the spring body 19 and pressing spring portion 20 are pushed down rearward, where upon the pressing force can be applied to the front face of the adjusting ring 10.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A back focus adjusting mechanism for an imaging camera including a camera housing, a lens mount protruding in the camera housing and including a cylindrical portion formed with a guide, an imaging element and an imaging lens, the back focus adjusting mechanism comprising a coil spring provided around the cylindrical portion of the lens mount, an imaging element holder holding the imaging element so that the imaging element is moved along an optical axis of the imaging lens by the guide of the lens mount, an adjusting ring provided with a cam the imaging element holder engages and a positioning holder fixed in the camera housing and positioning the adjusting ring so that the adjusting ring is rotatable around the cylindrical portion of the lens mount, the imaging element holder abutting the cam by rotation of the adjusting ring being moved, the back focus adjusting mechanism further comprising:

a spring member pressing the adjusting ring against the positioning holder and fixed in the camera housing; and a knob member operated outside the camera housing, wherein the adjusting ring is fixed at an adjustment position while being subjected to a pressing force of the spring member by the knob member.

2. A back focus adjusting mechanism according to claim 1, wherein the camera housing has a side wall formed with an opening, the mechanism further comprising a slider provided on an inner wall of the camera housing so as to be vertically slid and including a pressing boss, the knob member being mounted on the slider so that the knob member is operated through the opening, wherein the slider is slid so that the spring member is pressed by the pressing boss, whereby the adjusting ring is fixed at the adjustment position while being subjected to the pressing force of the spring member.

3. A back focus adjusting mechanism according to claim 1, wherein the spring member comprises a leaf spring including a spring body and a pressing portion continuous from the spring body and bent into a U-shape, the pressing portion being abutted against the adjusting ring.

4. A back focus adjusting mechanism according to claim 2, wherein the spring member comprises a leaf spring including a spring body and a pressing portion continuous from the spring body and bent into a U-shape, the pressing portion being abutted against the adjusting ring.

* * * * *